United States Patent
Albrecht et al.

(12) 
(10) Patent No.: US 10,374,834 B2
(45) Date of Patent: Aug. 6, 2019

(54) MODULAR INDUSTRIAL AUTOMATION APPLIANCE AND METHOD FOR TRANSMITTING MESSAGES VIA A BACKPLANE BUS SYSTEM OF THE MODULAR INDUSTRIAL AUTOMATION APPLIANCE

(71) Applicant: Siemens Aktiengesellschaft, Munich (DE)

(72) Inventors: Harald Albrecht, Nürnberg (DE); Reiner Plonka, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 348 days.

(21) Appl. No.: 14/632,699

(22) Filed: Feb. 26, 2015

(65) Prior Publication Data

US 2015/0249552 A1    Sep. 3, 2015

(30) Foreign Application Priority Data

Feb. 28, 2014   (EP) ..................................... 14157152

(51) Int. Cl.

| | |
|---|---|
| *H04L 12/66* | (2006.01) |
| *G05B 19/05* | (2006.01) |
| *H04L 12/931* | (2013.01) |
| *H04L 12/40* | (2006.01) |
| *H04L 12/741* | (2013.01) |

(Continued)

(52) U.S. Cl.
CPC ............. *H04L 12/66* (2013.01); *G05B 19/05* (2013.01); *H04L 12/40* (2013.01); *H04L 45/745* (2013.01); *H04L 49/15* (2013.01); *H04L 49/351* (2013.01); *H04L 49/40* (2013.01); *H04L 49/604* (2013.01); *H04L 69/18* (2013.01);

(Continued)

(58) Field of Classification Search
None
See application file for complete search history.

(56) References Cited

U.S. PATENT DOCUMENTS

| 6,963,922 B2 | 1/2005 | Papadopoulos et al. |
| 2002/0059485 A1 | 5/2002 | Godicke et al. |

(Continued)

FOREIGN PATENT DOCUMENTS

EP    1 188 293    10/2005

*Primary Examiner* — Jeffrey M Rutkowski
*Assistant Examiner* — Mehedi S Aley
(74) *Attorney, Agent, or Firm* — Cozen O'Connor

(57) ABSTRACT

A modular industrial automation appliance having a backplane bus system, a plurality of functional modules connected to the backplane bus system that each include a communication network adapter, a functional unit for implementing a communication protocol stack and a bridge element linked to the communication network adapter, wherein a router module connected to the backplane bus system is provided that includes a communication network adapter, a functional unit for implementing a router communication protocol stack, where the functional unit is linked to the communication network adapter, and for each functional module a respective link element, and where in such a link element links the functional unit for implementing the router communication protocol stack to the bridge element of the respective functional module via the backplane bus system such that only the communication protocol stack of the router module includes routing functions.

14 Claims, 2 Drawing Sheets

(51) Int. Cl.
*H04L 12/933* (2013.01)
*H04L 29/06* (2006.01)

(52) U.S. Cl.
CPC ............... *G05B 2219/15119* (2013.01); *G05B 2219/31234* (2013.01); *H04L 2012/4026* (2013.01)

(56) References Cited

U.S. PATENT DOCUMENTS

| | | |
|---|---|---|
| 2003/0067926 A1 | 4/2003 | Golikeri et al. |
| 2004/0114591 A1* | 6/2004 | Naismith ................. H04L 69/16 370/389 |
| 2007/0217392 A1* | 9/2007 | Motosugi .......... H04L 12/40032 370/351 |
| 2012/0113937 A1* | 5/2012 | Aramoto ............... H04W 8/082 370/329 |
| 2013/0107872 A1* | 5/2013 | Lovett ..................... H04L 49/10 370/352 |

* cited by examiner

MODULAR INDUSTRIAL AUTOMATION APPLIANCE AND METHOD FOR TRANSMITTING MESSAGES VIA A BACKPLANE BUS SYSTEM OF THE MODULAR INDUSTRIAL AUTOMATION APPLIANCE

BACKGROUND OF THE INVENTION

1. Field of the Invention

The present invention relates to modular industrial automation appliances and, more particularly, to a modular industrial automation appliance and method for transmitting messages via a backplane bus system of the modular industrial automation appliance.

2. Description of the Related Art

Industrial automation systems are used for monitoring, controlling and regulating technical processes, particularly in the realm of production, process and buildings automation, and allow operation of control devices, sensors, machines and industrial installations, where the operation is intended to be effected as autonomously and independently of human interventions as possible. On account of a constantly increasing importance of information technology for automation systems that comprise numerous networked control or computer units, methods for reliably providing functions distributed over an automation system to provide monitoring, control and regulatory functions are becoming increasingly important.

Interruptions in communication links between computer units in an industrial automation system or automation appliances can lead to undesirable or unnecessary repetition of transmission of a service request. These repeated service requests cause additional workload for communication links in the industrial automation system, which can lead to further system faults or errors. Furthermore, untransmitted or incompletely transmitted messages can prevent an industrial automation system from changing to or remaining in a safe operating state, for example. This can finally lead to failure of a complete production installation and to costly production outage. A particular set of problems in industrial automation systems regularly results from signaling traffic containing a relatively large number of, but relatively short, messages, which intensifies the above problems.

EP 1 188 293 B1 discloses an interface module for a programmable logic controller, where the interface module allows transmission of data requests by a communication appliance or a computer unit outside an industrial automation system to the programmable logic controller, such as by Internet. The interface module comprises a processor, having a realtime operating system, a communication network interface and a backplane bus driver for a backplane bus system of the programmable logic controller. Furthermore, a dual protocol stack, which comprises a first and a second protocol stack, and a client control process are implemented in the interface module. The client control process is used to communicate with the dual protocol stack and the backplane bus driver and to initiate data requests. In addition, a server control process is provided to communicate with the dual protocol stack and the backplane bus driver and to respond to data requests. Furthermore, a protocol control process is used to communicate with the dual protocol stack and the backplane bus driver and to retrieve and respond to requests sent to the protocol stack. While the first protocol stack is provided for non-time-critical messages, time-critical messages are handled by the second protocol stack.

US 2004/0114591 A1 describes a programmable logic controller that comprises a backplane bus system and modules connected to the backplane bus system that communicate via the backplane bus system using the Internet communication protocol (IP). In this case, each module has a dedicated IP address.

In order to transmit messages from different subnetworks between two IP-compatible modules, which are connected to a backplane bus system and each of which has an associated subnetwork, via the backplane bus system on an IP basis, it would be fundamentally possible for each IP-compatible module to have a dedicated IP stack provided and for the backplane bus system to be operated as a dedicated subnetwork. Here, a separate IP address on the backplane bus system and routing functions will need to be provided for each IP-compatible module. Message transmission between two subnetworks via the IP-compatible modules and the backplane bus system would thus always prompt two complete IP stacks to be processed, specifically when changing to the backplane bus system and when changing from the backplane bus system.

SUMMARY OF THE INVENTION it is therefore an object of the present invention to provide a method and modular industrial automation appliance that allows efficient IP-based message transmission via a backplane bus system of the automation appliance.

This and other objects and advantages are achieved in accordance with the invention by a modular industrial automation appliance and by a method, wherein the automation appliance in accordance with the invention has a backplane bus system and a plurality of functional modules connected to the backplane bus system. The functional modules each comprise a communication network adapter, a functional unit for implementing a communication protocol stack and a bridge element linked to the communication network adapter. To allow simple matching to application-specific requirements, the functional units for implementing a communication protocol stack are preferably each software-implemented. The bridge element has a first service access point for the functional unit for implementing the communication protocol stack and a second service access point that is associated with the backplane bus system. The communication protocol stacks of the functional modules comprise transport functions, while routing functions are exempt from the communication protocol stacks of the functional modules. The functional modules may be a central unit or a communication module of a modular automation appliance, for example.

Furthermore, the automation appliance in accordance with the invention has a router module that is connected to the backplane bus system and that comprises a communication network adapter, a functional unit for implementing a router communication protocol stack, where the functional unit is linked to the communication network adapter, and for each functional module a respective link element. The link element links the functional unit for implementing the router communication protocol stack to the second service access point of the respective functional module via the backplane bus system. Only the communication protocol stack of the router module comprises routing functions. The communication protocol stacks of the functional modules and the router protocol stack are preferably IP stacks, particularly Transmission Control Protocol/Internet Protocol (TCP/IP) stacks or User Datagram Protocol/Internet Protocol (UDP/

IP) stacks. Furthermore, link elements of the router module may advantageously be formed as virtualized communication network adapters.

In comparison with previous solutions, the automation appliance in accordance with the invention does not require an explicit IP subnetwork for the backplane bus system. This allows reduced management complexity. Furthermore, only the router module has routing functionality, but not the functional modules, in the case of the automation appliance accordance with the invention. For previous solutions, on the other hand, separate router units per functional module need to be planned, and managed consistently with one another.

In accordance with an advantageous embodiment of the automation appliance in accordance with the invention, the communication network adapters each comprise a transmission and reception unit and a functional unit for controlling access to a communication medium. The bridge elements are preferably each a Media Access Control (MAC) bridge. In accordance with a preferred embodiment of the present invention, the MAC bridges are each software-implemented. In order to avoid, or reduce unnecessary message traffic via the backplane bus system, the bridge elements in accordance with a further embodiment of the automation appliance in accordance with the invention advantageously each comprise a message filter unit at the second service access point. Here, messages may be data segments, data packets or data frames, for example, depending on the protocol level in question. For the purpose of reliably splitting messages that need to be processed via the communication protocol stacks of the functional modules and messages that need to be processed via the router communication protocol stack, each service access point preferably has a respective associated dedicated MAC address.

The method in accordance with the invention is provided for transmitting messages via a backplane bus system of an automation appliance according to the explanations above. In this case, messages received at the communication network adapters of the functional modules are forwarded in accordance with their respective destination MAC address to the first or second service access point of the bridge element of the respective functional module. Messages forwarded to the first service access point are processed by the functional unit for implementing the communication protocol stack of the respective functional module. By contrast, messages forwarded to the second service access point are forwarded to a respectively associated link element of the router module via the backplane bus system and processed by the functional unit for implementing the router communication protocol stack.

In a preferred development of the method in accordance with the invention, messages setting out from the functional units for implementing the communication protocol stack of the respective functional module are transmitted in accordance with their respective destination MAC address to the communication network adapter of the respective functional module or to the respectively associated link element of the router module. Furthermore, in a further embodiment of the method in accordance with the invention, messages setting out from the functional unit for implementing the router communication protocol stack are transmitted in accordance with their respective destination MAC address to the communication network adapter or the functional unit for implementing the communication protocol stack of the respective functional module via the respectively associated link element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
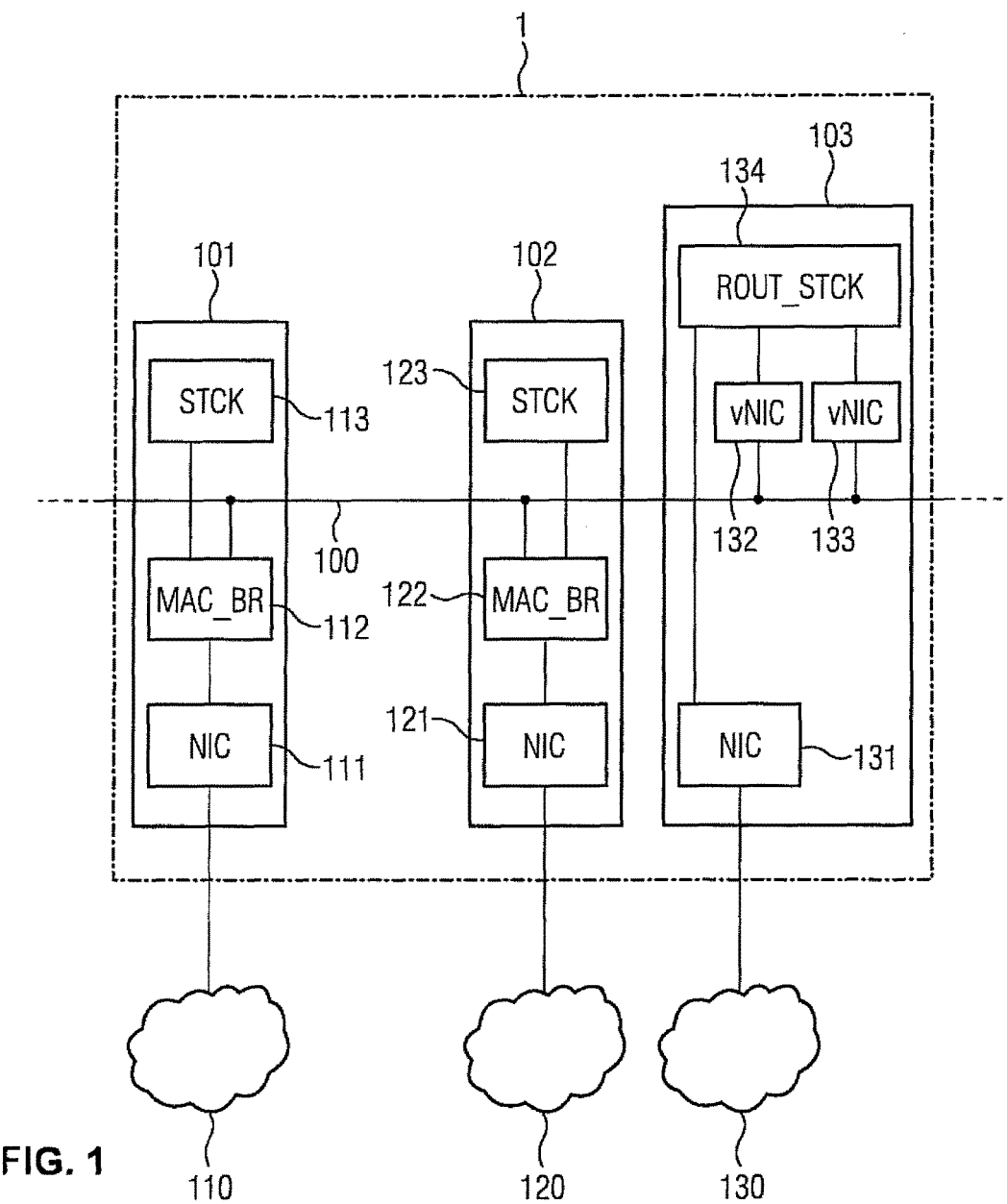
FIG. 1 shows a schematic illustration of a modular industrial automation appliance with a plurality of functional modules connected to a backplane bus system.
Figure 2:
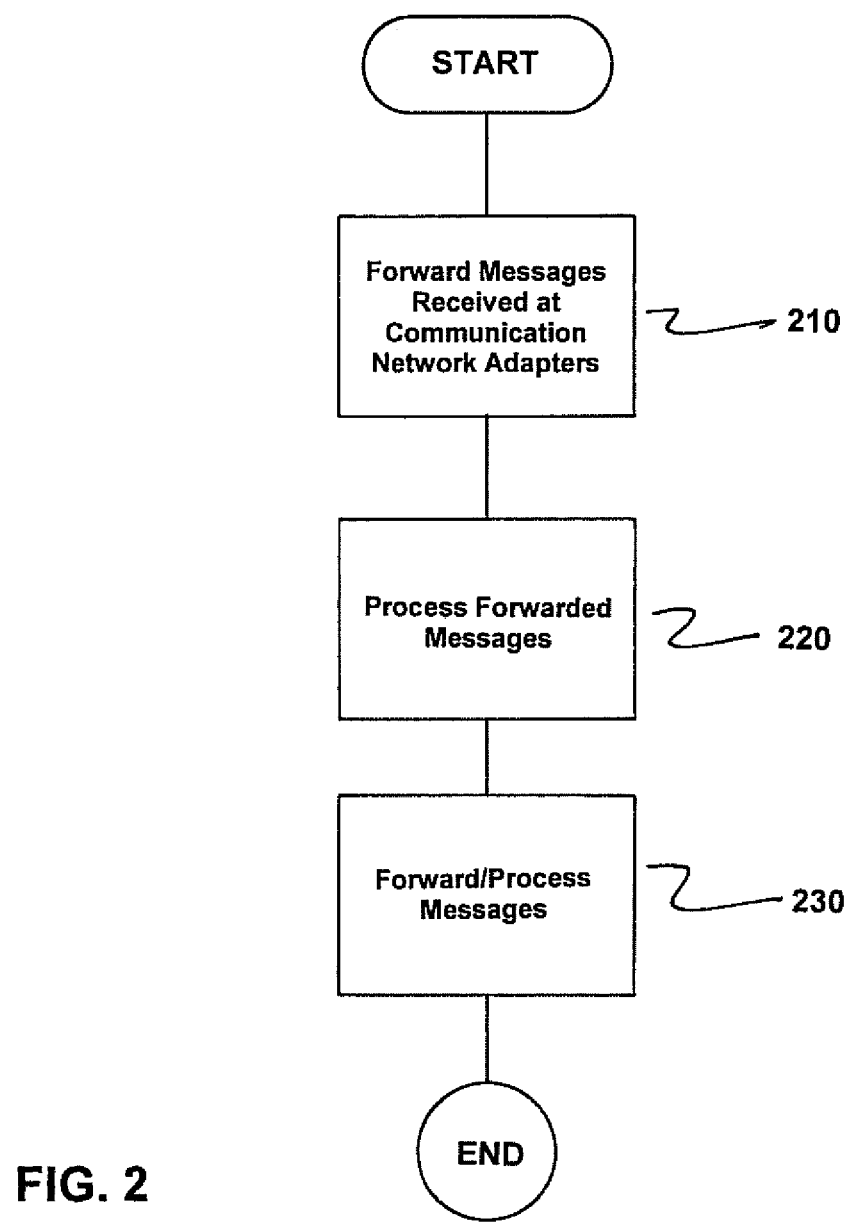
FIG. 2 is a flowchart of the method in accordance with the invention.

The automation appliance 1 shown in FIG. 1 has a backplane bus system 100 and two functional modules 101, 102 connected to the backplane bus system 100. In the present exemplary embodiment, the automation appliance 1 is a programmable logic controller. In this case, a first functional module 101 of the programmable logic controller is a communication processor, while a second functional module 102 is a control central unit.

Both functional modules 101, 102 each comprise a communication network adapter 111, 121 for connection to separate IP subnetworks 110, 120. Furthermore, the two functional modules 101, 102 each comprise a protocol functional unit 113, 123 for implementing a communication protocol stack, where the protocol functional unit accesses the respective communication network adapter 111, 121 via a communication network adapter driver as a hardware abstraction unit. The protocol functional units 113, 123 are preferably software-implemented.

Furthermore, both functional modules 101, 102 each comprise a preferably software-implemented MAC bridge 112, 122 that links the respective communication network adapter 111, 121 both to the backplane bus system 110 and to the protocol functional unit 113, 123 of the respective functional module 101, 102. To this end, each MAC bridge 112, 122 provides a first service access point for the respective protocol functional unit 113, 123 and a second service access point that is associated with the backplane bus system 110. Here, each service access point has an associated dedicated MAC address. In addition, the MAC bridges 112, 122 each have an integrated packet filter unit at their second service access point. This allows unroutable broadcasts to be filtered out, for example. This contributes to a reduced volume of messages via the backplane bus system.

Furthermore, the automation appliance 1 has an integrated router module 103 connected to the backplane bus system 110. The router module 103 comprises a communication network adapter 131, a router functional unit 134 for implementing a router communication protocol stack, where the router functional unit is linked to the communication network adapter 131, and a respective virtual communication network adapter 132, 133 for each functional module 101,

102. The virtual communication network adapters 132, 133 can be produced and removed in the router module 103 dynamically at runtime. The communication network adapter 131 connects the router module 103 to a separate IP subnetwork 130. A communication network adapter driver is in turn used by the router functional unit 134 to access the communication network adapter 131 of the router module 103. The router functional unit 133 is preferably software-implemented.

In the present exemplary embodiment, all of the communication network adapters 111, 121, 131 each comprise a transmission and reception unit (PHY) and a functional unit (MAC) for controlling access to a communication medium. When IPv6 is used, suitable router IP addresses can be derived based on planning and design for the communication network adapters 111, 121 of the functional modules 101, 102.

Both the communication protocol stacks of the functional modules 101, 102 and the router protocol stack are IP stacks in the present exemplary embodiment. The IP stacks of the functional modules 101, 102 are operated without IP routing functions. This is reserved just for the IP stack of the router module. Furthermore, the backplane bus system 100 does not form an IP subnetwork, but rather is used merely as a link between the virtual communication network adapters 132, 133 and the MAC bridges 112, 122.

Messages received at the communication network adapters 111, 112 of the functional modules 101, 102 are forwarded in accordance with their respective destination MAC address to the first or second service access point of the MAC bridge 112, 122 of the respective functional module 101, 102. Here, messages forwarded to the first service access point are processed by the protocol functional unit 113, 123 of the respective functional module 101, 102. By contrast, messages forwarded to the second service access point are forwarded to the respectively associated virtual communication network adapter 132, 133 of the router module 103 via the backplane bus system 110 and then processed by the router functional unit.

Messages emanating from the protocol functional units 113, 123 are transmitted in accordance with their respective destination MAC address to the communication network adapter 111, 121 of the respective functional module or to the respectively associated virtual communication network adapter 132, 133 of the router module 103. Furthermore, messages emanating from the router functional unit 134 are transmitted in accordance with their respective destination MAC address to the communication network adapter 111, 121 or the router functional unit 113, 123 of the respective functional module 101, 102 via the respectively associated virtual communication network adapter 132, 133.

With respect to communication network planning, the router module 103 behaves as an independent router that is connected to the IP subnetworks of a modular automation appliance in parallel with the latter. In accordance with the present exemplary embodiment, route configuration is centralized in the router module 103, instead of being split over a plurality of communication module, as in the case of previous solutions. It is therefore a simple matter to ensure consistency. Furthermore, repercussions from IP routing functions of a modular industrial automation appliance on firmware of the functional modules 101, 0.102 are minimized, because the MAC bridges 112, 122 effect encapsulation. Firmware expansion or firmware error correction for the router module 103 fundamentally requires no fresh matching of the MAC bridges 112, 122. Furthermore, the router module 103 can implement additional functionality with an optional firewall without this requiring changes of firmware for the functional modules 101, 102.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A modular industrial automation appliance comprising:
a backplane bus system;
a plurality of functional modules connected to the backplane bus system, each of the functional modules comprising:
   a communication network adapter which connects to a respective separate IP subnetwork which is external to each of the plurality of functional modules;
   a functional unit for implementing a communication protocol stack; and
   a bridge element linked to the communication network adapter and having a first service access point for the functional unit for implementing the communication protocol stack and a second service access point associated with the backplane bus system, the communication protocol stacks of the functional modules comprising transport functions, and wherein routing functions being excepted from the communication protocol stacks of the functional modules; and
a router module connected to the backplane bus system and comprising:
   a communication network adapter which connects to a respective separate IP subnetwork which is external to the router module;
   a functional unit for implementing a router communication protocol stack, the functional unit being linked to the communication network adapter; and
   for each functional module a respective virtual communication network adapter that links the functional unit for implementing the router communication protocol stack to the second service access point of the respective functional module via the backplane bus system;
wherein only the communication protocol stack of the router module comprises routing functions.

2. The modular industrial automation appliance as claimed in claim 1, wherein the communication protocol stacks of the functional modules and the router protocol stack are IP stacks, particularly Transmission Control Protocol/Internet Protocol (TCP/IP) stacks or User Datagram Protocol/Internet Protocol (UDP/IP) stacks.

3. The modular industrial automation appliance as claimed in claim 2, wherein each communication network adapter which connects to a respective separate IP subnetwork comprises a transmission and reception unit and a functional unit for controlling access to a communication medium.

4. The modular industrial automation appliance as claimed in claim 1, wherein each communication network adapter which connects to a respective separate IP subnetwork comprises a transmission and reception unit and a functional unit for controlling access to a communication medium.

5. The modular industrial automation appliance as claimed in claim 1, wherein the bridge element comprises a Media Access Control (MAC) bridge.

6. The modular industrial automation appliance as claimed in claim 5, wherein the MAC bridges is implemented via software.

7. The modular industrial automation appliance as claimed in claim 1, wherein the bridge element comprises a message filter unit disposed at the second service access point.

8. The modular industrial automation appliance as claimed in claim 1, wherein the first and second service access points have a respective associated dedicated Media Access Control (MAC) address.

9. The automation appliance as claimed in claim 1, wherein the functional unit for implementing the communication protocol stack is implemented via software.

10. The automation appliance as claimed in claim 1, wherein the functional module comprises at least one of (i) a central unit of the modular automation appliance and (ii) a communication module of the modular automation appliance.

11. A method for transmitting messages via a backplane bus system of a modular industrial automation appliance, the method comprising:
    forwarding messages received at communication network adapters of functional modules connected to respective separate IP subnetworks which is external to the functional modules in accordance with their respective destination Media Access Control (MAC) address to at least one of (i) a first service access of a bridge element of a respective functional module and (ii) a second service access point of the bridge element of the respective functional module
    processing messages forwarded to the first service access point by the functional unit to implement a communication protocol stack of the respective functional module;
    forwarding messages forwarded to the second service access point to a respectively associated virtual communication network adapter of a router module, which connects to a respective separate IP subnetwork which is external to the router module, via the backplane bus system and processing the forwarded messages by the functional unit for implementing the router communication protocol stack.

12. The method as claimed in claim 11, further comprising:
    transmitting messages emanating from functional units for implementing the communication protocol stack of the respective functional module in accordance with their respective destination MAC address to at least one of (i) the communication network adapter of the respective functional module and (ii) the respectively associated virtual communication network adapter of the router module.

13. The method as claimed in claim 12, further comprising:
    transmitting messages emanating from the functional unit for implementing the router communication protocol stack in accordance with their respective destination MAC address to at least one of (i) the communication network adapter and (ii) the functional unit for implementing the communication protocol stack of the respective functional module via the respectively associated virtual communication network adapter.

14. The method as claimed in claim 11, further comprising:
    transmitting messages emanating from the functional unit for implementing the router communication protocol stack in accordance with their respective destination MAC address to at least one of (i) the communication network adapter and (ii) the functional unit for implementing the communication protocol stack of the respective functional module via the respectively associated virtual communication network adapter.

\* \* \* \* \*